United States Patent Office 3,740,248
Patented June 19, 1973

---

3,740,248
ANTI-OFFSET POWDER
Warren G. Buhler, Westfield, and Albert Maletsky, Ramsey, N.J., assignors to Oxy-Dry Sprayer Corporation, Chicago, Ill.
No Drawing. Filed Dec. 28, 1970, Ser. No. 102,136
Int. Cl. B41m 1/06, 7/02
U.S. Cl. 117—13                                   8 Claims

---

ABSTRACT OF THE DISCLOSURE

A powder is disclosed which includes a rigid core material, e.g.—starch, encapsulated with an outer shell of a wax or wax-like material which has certain predetermined melting and penetration properties, the powder finding particular utility in the printing field for preventing offset and the like. Methods for making the wax-encapsulated powder are also disclosed.

---

This invention relates to powder compositions useful in printing and other fields where it is necessary to separate adjacent surfaces and, more particularly, to wax-encapsulated powders which may be advantageously employed to prevent offset and the like.

In offset printing, freshly printed sheets must be provided with some type of a coating just prior to their being deposited on the delivery stack to prevent the freshly printed impression on one sheet from being offset onto the back of the succeeding sheet deposited in the same stack. The coating typically comprises a layer of powder, the powder used being termed an "anti-offset" powder.

To function effectively as an anti-offset powder, a number of criteria must be met. The powder must be capable of being readily dispensed, i.e.—such as from the electrostatic sprayers that are in general use and are illustrated in, for example, U.S. Pat. No. 3,292,046. It must accordingly be substantially free flowing, have an ability to electrically charge and retain the charge at least for a sufficient time to allow deposition onto the printed surface. It is also necessary that the powder be capable of having only a minimal tendency to absorb moisture when exposed to conditions of high humidity. The susceptibility to absorb moisture may cause lumping, reduce flow and result in an inability to properly acquire and maintain an electrostatic charge.

To accomplish its prevention of offset, the powder must be sufficiently rigid to stand up under the weight of the stack and must not have any sharp edges that would result in the scratching of the ink.

Because of these and other varying requisites for the anti-offset powder and also due to the wide variety of printing operations and surfaces that are printed, a large number of materials have been given trials as anti-offset powders. Generally, due to its relatively low cost and its availability in a wide range of particle sizes, a number of starch materials such as sago, corn, tapioca, arrowroot and potato powder have been employed. However, the low resistance to absorbency of moisture has frequently required that a minor amount (i.e.—1 to 5 percent by weight) of a free-flowing agent (e.g.—china clay, colloidal silica or tricalcium phosphate) be used in conjunction with the powder and that the surfaces of the starch particles be treated with various types of resins such as silicone resins to form a hydrophobic coating. In addition, a physical mixture of a starch powder and wax particles have also been used, the starch having the load-bearing quality to prevent offset and the wax providing a burnishing effect on the printed surface.

It is an object of the present invention to provide a powder characterized by a predetermined rigidity or load-bearing capacity yet which also imparts a burnishing effect to a surface coated by a profile of the powder. A more specific object lies in the provision of a powder having sufficient rigidity or load-bearing ability to function as an anti-offset powder and which also may be readily sprayed onto a surface to lay down a profile that imparts a smooth, glossy effect to the surface.

A further object provides a powder of the hereinbefore-described type which is substantially impervious to moisture so as to be capable of being sprayed onto a surface despite adverse humidity conditions.

A still further object is to provide a powder of the hereinbefore-described type characterized by a smooth exterior which will not scratch the surface being coated or, in the case of a printed surface, the ink.

Another object of this invention provides a powder of the hereinbefore-described type which has sufficient integrity to allow adjacent surfaces to be readily moved relative to one another, i.e.—the powder providing a "slip" feature.

Yet another object is to provide economical methods for manufacturing powders having the hereinbefore-described properties.

A further object of the present invention lies in the provision of a method of preventing offset by employing a powder having the hereinbefore-described properties.

Other objects and advantages will become apparent from the following description.

While the present invention is susceptible of various modifications and alternative forms, there is shown and will herein be described in detail certain preferred embodiments. It is to be understood, however, that it is not intended to limit the invention to the specific forms disclosed. On the contrary, it is intended to cover all modifications, and alternative constructions falling within the spirit and scope of the invention as expressed in the appended claims. For example, while the exemplary embodiment is described as having advantageous utility as an anti-offset powder in offset web-fed or sheet-fed printing, it should be readily appreciated that the powder of the present invention may be utilized in many other applications. More particularly, the powder of this invention may be advantageously employed in applications wherein adjacent surfaces or objects are separated by a powder profile which serves as a barrier so that the surfaces or objects may be readily moved or slid relative to each other.

Briefly, and in accordance with the present invention, there is provided a micron-sized powder having a generally spherical exterior and consisting of a relatively hard core (i.e.—starch) having a predetermined load-bearing capacity with a relatively soft material encapsulating the core (i.e.—a wax). Also, in accordance with the present invention, these micron-sized particles are formed by dispersion or spraying processes under specified conditions as will hereinafter be described in detail.

In the prefered embodiment, the powder has an average particle size of from about 15 to about 80 microns and comprises a starch central core with from about 1 to about 10 percent of the total weight of a wax-like material having a penetration number of less than about 8 and a melting point in the range of from about 160° F. to about 300° F. Powders formulated as described have the ability to acquire an electrostatic charge so they can be readily sprayed and function in use, as an anti-offsetting powder, which is sufficiently soft so as to not scratch the ink yet which has sufficient load-bearing capacity to prevent offset. In addition, the wax-like exterior at least partially breaks down to provide the surface with a smooth, glossy effect.

To serve as the central core, the prime requirement is that the material have sufficient rigidity or load-bearing capacity to stand up against the compressive forces involved in the specific end use. More specifically, the core should be able to serve the function as a physical separation barrier between adjacent surfaces or objects without breaking down so as to allow undesired contact between the surfaces or objects. In addition, the core material should be capable of providing a surface to which the wax-like coating can readily adhere and should be non-reactive with the coating. Still further, the material used for the core should not otherwise inhibit the use of the composite material in its spraying and anti-offset functions. Typically, the core material particles may have a size of from about 10 to 180 microns.

Due to their ready availability in a variety of sizes, starch materials are preferred, particularly when the encapsulated powder is to be in the lower range size-wise. The general range of particle size for starch materials varies from about 15 to 20 microns for corn starch to about 80 microns in size for potato starch.

In addition, the core material can also be an inorganic ingredient such as talc or glass beads, clay, or a plastic material such as polyethylene, polypropylene, polystyrene, polyvinyl chloride (both homopolymers and copolymers), depending upon the particle size, particle configuration, resiliency and cost factors that are required and the particular contemplated end use. It should be, of course, appreciated, that not all plastic materials are rigid enough to serve as the core. Also, not all types of the listed plastic materials can be used. For example, in the case of polyethylene and polypropylene, only the high molecular weight materials have the necessary rigidity.

The outer shell, in accordance with the present invention, is a wax or wax-like material having a specified hardness and melting point. The outer shell, encapsulating as it does the inner core, covers the irregularities on the surface of the starch or other material used as the core and minimizes the scratching of the printing. The specific thickness may be varied depending upon the type of final product required, but the outer shell should constitute from about 1 to about 10 percent of the total weight of the wax-encapsulated core.

The wax material utilized should be capable of providing a gloss or burnishing effect on the sheet, and should be scuff-resistant. To provide the burnishing effect, the wax-like material must be capable of at least partially breaking down to form a coating on the surface or object being protected from the adjacent surface or object. Also, it should be highly water resistant together with the ability to pick up and maintain an electrical charge so as to be capable of being electrostatically sprayed. Suitable materials are those which have a penetration value from about 0 to about 8 millimeters/50 grams/5 seconds/77° F. (this being termed the penetration number and being determined by procedures well known in the art) and, additionally, a melting point in the range of from about 160° F. to about 300° F. In use as anti-offset powders, materials which are too soft tend to build up on the spraying apparatus whereas materials which are too hard tend to scratch the ink.

Suitable materials include natural waxes such as carnauba and ozocerite, petroleum waxes such as high melting point paraffinic waxes and those of the microcrystalline type and synthetic high melting point waxes of the Fischer-Tropsch type. Others include wax-like ketones such as stearone, waxy alcohols such as 12-hydroxy stearyl alcohol, waxy esters such as methyl-12, hydroxy stearate and amide derivatives of fatty acids such as bis-stearamide. Still further, plastic materials such as polyethylenes, polypropylenes, ethylene-vinyl acetate copolymers and ethylene-vinyl acrylates could be employed. It should be appreciated that all plastic materials cannot be used. For example, only the low molecular weight types which have a sufficiently low viscosity and a penetration number in the range hereinbefore set forth are suitable. It should be appreciated that it is also possible to formulate combinations of various materials to obtain a wide variety of properties.

In accordance with one aspect of the present invention, the powder is formed by intimately dispersing the wax in finely divided form and the core material in a mixing environment, mixing the materials while heating until the wax material has melted, continuing to mix the molten wax and core material until the wax has uniformly coated the core material and thereafter cooling to substantially ambient temperatures while mixing to prevent agglomeration of the thus-formed wax encapsulated core material.

To form the wax encapsulated powder in this fashion, a predetermined quantity of the wax in finely divided form is added to a quantity of the starch or other core material and intimately dispersed in a cold state in a mixer. While the mixing continues, the temperature of the mix is then slowly increased at a rate which is maintained so that the wax material and core materials are not degraded, i.e.—as by oxidation or discoloration until the wax has reached a molten state.

The mixing should continue (with sufficient heating to maintain the wax in a molten state) until the molten wax has had an opportunity to be distributed uniformly over the surface of the starch particles. It is generally suitable to heat the intimate dispersion to a temperature up to about 10° or 20° F. above the melting point and maintain this temperature for up to 15 minutes or even more. The time necessary depends on the type of mixing equipment being used.

The temperature is then gradually decreased to ambient conditions and mixing is continuously carried out to allow slow congealing of the wax without sudden chilling and agglomeration of the encapsulated powder. The finished powder may then be screened and processed further as desired.

The quantity of wax which is used in relation to the amount of the core material will, of course, vary with the specific proportions which are required for the final product. However, when the wax material is to provide a coating such that the wax will be about 5 to 10% of the total weight of the finished product, a mixer having a 1,000 lb. capacity may include 50 to 100 lbs. of the wax material and about 900 to 950 lbs. of the starch or other suitable core material.

It should be appreciated that the mixer which is employed must have sufficient power and good dispersion characteristics so that the wax is spread or distributed evenly over the surface of the core material while preventing the viscous contents to become a single mass. Preferably, the mixer should be capable of creating a shearing action. Such mixers are commercially available, and commercially available double arm sigma blade mixers and double shaft ribbon mixers are representative examples of mixers that may be advantageously employed. It may be desirable to utilize stainless steel mixers, where the core material (e.g.—starch) evolves moisture in the mixing.

In accordance with another aspect of the present invention, the wax-encapsulated powder of the present invention may be formed by placing a predetermined quantity of the starch or other core material into a mixer (having the characteristics as hereinbefore described) and gradually heating to a temperature which is slightly below (i.e.—10° F. to 20° F.) the melting point of the wax material being utilized as the encapsulation medium. The wax is melted in a separate unit and heated to a temperature which is appropriate for spraying. Spraying heads may be located inside the top of the mixer and a heated environment provided to prevent sudden congealing of the molten wax spray.

While the starch or other core material is being continuously mixed, the wax is sprayed onto the surface of the starch particles. By properly controlling the temperature of the wax spray, the core material and the rate of mixing, a particle with a uniform wax coating can be achieved. The thickness of the layer is dependent upon the quantity of the wax sprayed. The mix may then be cooled to ambient temperatures as in the initial process, screened and further processed, also as hereinbefore described.

Unless the wax material has a melting point in the low part of the range, it is necessary to use a heated carrier such as air (i.e.—heated to above at least about 200° F.) in spraying the wax so that the sprayed wax particles do not congeal before contacting the core particles. The extent to which the air is heated will, of course, be dependent upon the melting point of the wax being sprayed. As the melting point increases, the air temperature should be higher to prevent congealing. Suitable wax spraying devices are well known, and the type shown in U.S. 2,817,600 to J. G. Yahnke has been advantageously employed.

The spray rate of the wax should be coordinated with the rate of mixing so that the core materials are uniformly coated. Spray at too fast a rate will result in a non-uniform coating. While these parameters can, of course, vary within wide limits, it has been found suitable, for example, when using a double arm sigma blade mixer having a 1,000 lb. capacity and using a wax with a melting point of 200° F., to set the mixer at 50 r.p.m. and employ a spray rate of 1.5 lbs. wax/min. with the wax being sprayed at a temperature of about 220° F. and the temperature of the air being used as the spray medium being heated to 200° F.

Whether the wax particles are pre-sprayed or are sprayed directly onto the core particles, the size should be maintained within certain general limits. Thus, the wax particles should have a size generally in the range of the average size of the core particles so that a uniform coating or encapsulation of the core material results. It has been found satisfactory to employ wax particles from about the same size up to about 5 times the core size.

The resulting wax-encapsulated powder has an average size of from about 11 to 200 microns, 17 to 100 for starch. The particles are generally spherical in shape and are free from any rough edges. The powder is impervious to moisture, can acquire and retain an electrostatic charge and can be readily sprayed in commercially available electrostatic sprayers.

The following are examples of how the powders of the present invention could be made. These examples are illustrative of the present invention and should not be considered in limitation thereof.

EXAMPLE 1

Wax encapsulated cornstarch is made by employing a Paul O. Abbe Co., Little Falls, N.J., double shaft, jacketed pilot ribbon mixer, having a capacity of 100 lbs. with a variable speed control, an electric oil heater for heating heat transfer fluid and a refrigeration unit for cooling. Ninety-five pounds of cornstarch having an average size of 15 to 20 microns is used as the core material and 5 lbs. of a synthetic wax of the Fischer-Tropsch type having a melting point of 200° F. ("Paraflint RG," Moore & Munger, Inc., New York, N.Y.) serves as the wax encapsulating material. The wax is pre-sprayed in a sprayer of the type shown in U.S. 2,817,600.

The wax-starch batch is mixed for about 40 minutes, with the speed control being set at ½ speed (e.g.—about 25 r.p.m.) and the oil temperature dial set at 250° F. The batch temperature increases from 72° F. to 220° F. Mixing continues for 15 minutes with the speed control being set at full speed (about 50 r.p.m.) and the oil temperature dial set at 230° F. The batch temperature increases from 220° F. to 225° F.

The wax has now evenly coated the starch particles and the powder batch is cooled to substantially ambient conditions. The speed control remains at full speed, the oil temperature is turned off and the refrigeration unit dial temperature is set at 30° F. Mixing continues for 75 minutes and the batch temperature decreases from 225° F. to 85° F.

The resulting wax-encapsulated starch particles are substantially spherical in shape, are impervious to moisture and may be readily sprayed in electrostatic powder sprayers.

EXAMPLE 2

Various starch materials are encapsulated using a 400 ml. Pyrex beaker, a Briskheat heating jacket with temperature control, a Lightnin agitator with speed control and a wax sprayer of the type shown in U.S. 2,817,600.

The waxes are melted individually and pre-sprayed to an average particle size of 50–60 microns. The wax powder is then intimately mixed with the starch at ambient conditions. The mixture is then placed in a beaker held in a heating jacket and the temperature is adjusted to heat the powder to slightly above the melting point of the wax powder while maintaining the mixture under constant agitation. The mixture is held at this temperature for 10 minutes and then allowed to cool slowly while continuing the agitation at a sufficiently rapid rate to prevent agglomeration.

Upon cooling to room temperature, the sample is screened through a 120 mesh screen. Table I below sets forth the process parameters and the starting materials:

TABLE I

| Core | Average particle size, microns | Weight percent core | Wax | Weight percent wax | Maximum temp. of batch, °F (Tm) | Time to reach Tm, min. | Time to cool to room temp., min. |
| --- | --- | --- | --- | --- | --- | --- | --- |
| Corn starch | 15–20 | 95 | Fischer-Tropsch [1] | 5 | 230 | 18 | 25 |
| Potato | 80 | 95 | do | 5 | 230 | 15 | 20 |
| Tapioca | 20–25 | 98 | Castor oil wax [2] | 2 | 205 | 12 | 20 |
| Talc | 1–5 | 95 | Fischer-Tropsch [1] | 5 | 230 | 16 | 25 |

[1] A synthetic straight chain hydrocarbon wax of the Fischer-Tropsch type with a molecular weight of about 750 and a melting point of about 214° F.
[2] A hydrogenated castor oil wax (principally glyceryl-tri-12-hydroxystearate) with a melting point of 183–190° F.

The wax-encapsulated starch powders are found to be capable of being readily sprayed in electrostatic powder sprayers.

Thus, as has been seen, the present invention provides an anti-offset powder which is soft enough to provide a gloss or burnishing effect to the sheet that is being coated yet which is sufficiently rigid so that the protection will not be lost as the compressive forces in the stacking operation increase. In addition, the powders made in accordance with the present invention are scuff-resistant and water-resistant. The powders are also freely flowable and are readily capable of being electrostatically sprayed in the electrostatic sprayers, which are in wide use for the dispensing of anti-offset powders.

We claim as our invention:

1. A method of forming a wax-encapsulated powder which comprises forming a mixture of a finely divided wax material having a penetration number less than about 8 and a melting point of from about 160° F. to about 300° F. and a rigid central core material having predetermined load-bearing capabilities and an average particle size of from about 10 to about 180 microns, the wax material constituting from about 1 to about 10% of the total weight, mixing the mixture while slowly heating to a temperature which melts the wax material, maintaining the wax material in a molten state while continuing mixing for a time sufficient to allow the wax material to uniformly coat the rigid central core particles and thereafter cooling to ambient temperatures while mixing to allow slow congealing and preventing agglomeration of the thus-formed powder.

2. The method of claim 1 wherein the rigid central core material is starch.

3. A method of forming a wax-encapsulated powder which comprises introducing a predetermined quantity of a rigid central core material having predetermined load-bearing capabilities and an average particle size of from about 10 to about 180 microns in an enclosed environment, heating a wax material having a penetration number less than about 8 and a melting point in the range of from about 160° F. to about 300° F. to a temperature at which it may be sprayed, raising the temperature of the environment to from about 10 to about 20° F. below the melting point of the wax material, spraying the wax material onto the rigid central core particles while continuously mixing the rigid central core particles, maintaining the spray at a rate and for a time sufficient to uniformly coat the rigid central core particles with from about 1 to about 10% of the total weight of the thus-formed encapsulated rigid central core particles and cooling to ambient temperatures while continuing mixing to allow slow congealing without agglomeration of the wax encapsulated rigid central core particles.

4. The method of claim 3 wherein the rigid central core material is starch.

5. An anti-offset powder comprising particles having a starch central core and a wax material encapsulating the starch central core, the wax material having a penetration number of less than about 8 and a melting point of from about 160° F. to about 300° F., the wax material constituting from about 1 to about 10% by weight of the total weight of the particles and the particles having an average particle size of from about 17 to about 100 microns, the particles being generally spherical in shape, impervious to moisture and capable of acquiring and retaining an electrical charge.

6. A wax-encapsulated powder comprising a rigid central core and a wax material encapsulating the central core, the wax material having a penetration number of less than about 8 and a melting point of from about 160° F. to about 300° F., the wax material comprising from about 1 to about 10% by weight of the total weight of the powder, the powder having a size of from about 11 to 200 microns.

7. The method of preventing offset from a freshly printed surface of a sheet to an adjacent sheet in a delivery in offset planographic printing which comprises applying to the freshly printed face of a sheet a coating of an anti-offset powder comprising a rigid central core having a predetermined load-bearing capacity and a wax-like material encapsulating the central core, the wax material having a penetration number of less than about 8 and a melting point of from about 160° F. to about 300° F., the wax material constituting from about 1 to about 10% by weight of the total weight of the powder and the powder having an average particle size of from about 11 to about 200 microns.

8. The method of claim 7 wherein the rigid central core is starch and the average particle size of the powder is from about 17 to about 100 microns.

References Cited

UNITED STATES PATENTS

| | | | |
|---|---|---|---|
| 3,313,640 | 4/1967 | Bauer | 117—100 X |
| 3,050,416 | 8/1962 | Yahnke | 101—416 X |
| 3,280,064 | 10/1966 | Hammer et al. | 117—161 |
| 697,374 | 4/1902 | Stuart et al. | 101—416 |
| 2,817,600 | 12/1957 | Yahnke | 101—416 X |
| 2,914,498 | 11/1959 | Quarles et al. | 117—161 |
| 3,003,536 | 10/1961 | Culberson et al. | 117—100 X |
| 3,292,046 | 12/1966 | Buhler | 101—416 X |
| 1,445,273 | 2/1923 | Gramer | 117—13 |
| 2,078,790 | 4/1937 | Bucy | 117—13 |
| 2,142,668 | 1/1939 | Bucy | 117—13 |
| 2,317,372 | 4/1943 | Gessler et al. | 117—13 X |
| 2,817,310 | 12/1957 | Ponzini | 117—13 X |

FOREIGN PATENTS

| | | | |
|---|---|---|---|
| 1,005,746 | 9/1965 | Great Britain | 117—100 B |
| 1,020,544 | 2/1966 | Great Britain | 117—100 B |

RALPH HUSACK, Primary Examiner

U.S. Cl. X.R.

117—16, 100 A, B, C, S, 104 R